US009502882B2

(12) United States Patent
Fu et al.

(10) Patent No.: US 9,502,882 B2
(45) Date of Patent: Nov. 22, 2016

(54) FAULT DETECTION AND ZONE LOCATION SYSTEM

(71) Applicant: EATON CORPORATION, Cleveland, OH (US)

(72) Inventors: Qiang Fu, Milwaukee, WI (US); Yi Yang, Milwaukee, WI (US); Charles John Luebke, Hartland, WI (US); Xin Zhou, Wexford, PA (US)

(73) Assignee: EATON CORPORATION, Cleveland, OH (US)

( * ) Notice: Subject to any disclaimer, the term of this patent is extended or adjusted under 35 U.S.C. 154(b) by 221 days.

(21) Appl. No.: 14/245,264

(22) Filed: Apr. 4, 2014

(65) Prior Publication Data

US 2015/0288165 A1  Oct. 8, 2015

(51) Int. Cl.
| | | |
|---|---|---|
| *H02H 7/30* | (2006.01) | |
| *H02H 3/093* | (2006.01) | |
| *H02H 1/00* | (2006.01) | |
| *H02H 7/26* | (2006.01) | |

(52) U.S. Cl.
CPC ............ *H02H 3/093* (2013.01); *H02H 1/0076* (2013.01); *H02H 7/261* (2013.01); *H02H 7/30* (2013.01)

(58) Field of Classification Search
CPC .......... H02H 3/93; H02H 7/30; H02H 7/261; H02H 1/0076
USPC .......................................................... 361/62
See application file for complete search history.

(56) References Cited

U.S. PATENT DOCUMENTS

| | | | | |
|---|---|---|---|---|
| 4,922,368 | A * | 5/1990 | Johns ................. | H02H 7/26 361/62 |
| 5,905,616 | A * | 5/1999 | Lyke .................. | H02H 7/30 307/39 |
| 7,599,161 | B2 * | 10/2009 | Premerlani ........... | H02H 7/30 361/62 |
| 8,040,644 | B2 | 10/2011 | Hastings et al. | |
| 8,280,653 | B2 * | 10/2012 | Lagree ............... | H02H 7/30 361/63 |
| 8,514,531 | B1 | 8/2013 | Zhou et al. | |
| 2008/0198521 | A1 * | 8/2008 | Weiher .............. | H02H 7/262 361/64 |
| 2009/0161270 | A1 * | 6/2009 | Beatty, Jr. ........... | H02H 9/00 361/42 |

FOREIGN PATENT DOCUMENTS

| | | |
|---|---|---|
| EP | 2 549 612 A2 | 1/2013 |
| GB | 2 270 217 A | 3/1994 |

OTHER PUBLICATIONS

European Patent Office, "International Search Report and Written Opinion", May 4, 2015, 10 pp.

* cited by examiner

*Primary Examiner* — Scott Bauer
(74) *Attorney, Agent, or Firm* — Eckert Seamans; Philip Levy; Grant Coffield

(57) ABSTRACT

A method of protecting a power distribution system from a fault on a feed conductor thereof, wherein an HFAC signal is provided to the feed conductor from a location downstream of the feed conductor in the power distribution system. The method includes, in a module located upstream of the feed conductor in the power distribution system, determining an HFAC signal magnitude in the module, the module including a circuit interrupter, and controlling operation of the circuit interrupter based on the determined magnitude.

18 Claims, 5 Drawing Sheets

FAULT DETECTION AND ZONE LOCATION SYSTEM

BACKGROUND

Field

The disclosed concept pertains generally to electrical distribution systems having a number of circuit protection devices, such as circuit breakers having configurable electronic trip units, and, more particularly, to a system for detecting faults in such an electrical system distribution and locating the zones where the faults occurred.

Background Information

Circuit interrupters, such as for example and without limitation, circuit breakers, are used to protect electrical circuitry from damage due to an overcurrent condition, such as an overload condition, a short circuit, or another fault condition, such as an arc fault or a ground fault. Molded case circuit breakers (MCCBs) typically include a pair of separable contacts per phase. The separable contacts may be operated either manually by way of a handle disposed on the outside of the case or automatically in response to a detected fault condition. Typically, such circuit breakers include an operating mechanism, which is designed to rapidly open and close the separable contacts, and a trip mechanism, such as a trip unit, which senses a number of fault conditions to trip the breaker automatically. Upon sensing a fault condition, the trip unit trips the operating mechanism to a trip state, which moves the separable contacts to their open position.

Typically, in a power distribution system, two or more circuit interrupters will be positioned between a load and the source of the fault current. In order to minimize electrical service interruption, the circuit interrupters are selective in response to the fault such that the one upstream and nearest the fault will first attempt to interrupt the fault current. If this circuit interrupter does not timely clear the fault, then the next upstream circuit interrupter will attempt to do so, and so on. This response selectivity is sometimes termed system selective coordination.

However, when a short circuit occurs in a power distribution system, it can be difficult to achieve selective coordination among circuit interrupters. This may lead to either failed isolation of the fault that causes an upstream circuit interrupter to also trip, resulting in broader power outage to a facility or process, or high let through energy due to delayed circuit interruption. Thus, the ability to identify and locate which zone within a power distribution system has a short circuit fault would provide improved coordination, and reduce the time and amount of energy dissipated in the electrical system and circuit interrupter.

SUMMARY

In one embodiment, method of providing selective coordination in a power distribution system having a first feeder circuit zone and a second feeder circuit zone located downstream from the first feeder circuit zone in response to a fault in the second feeder circuit zone is provided. The power distribution system includes a first module having a first circuit interrupter located upstream of the first feeder circuit zone and a second module having a second circuit interrupter located between the first feeder circuit zone and second feeder circuit zone, and a first HFAC signal is provided to the first feeder circuit zone from a location downstream of the first feeder circuit zone and a second HFAC signal is provided to the second feeder circuit zone from a location downstream of the second feeder circuit zone. The method includes determining a second HFAC signal magnitude in the second module, causing the second circuit interrupter to perform an instantaneous trip based on a value of the second HFAC signal magnitude, determining a first HFAC signal magnitude in the first module, and causing the first circuit interrupter to perform a hold and delay trip based on a value of the first HFAC signal magnitude.

In another embodiment, a circuit interrupter for use in a location upstream of a first feeder circuit zone of a power distribution system is provided that includes separable contacts, an operating mechanism configured to open and close the separable contacts, and an electronic trip unit structured to cooperate with the operating mechanism to trip open the separable contacts. The electronic trip unit is structured and configured to receive an HFAC signal magnitude measured at the location upstream of the first feeder circuit zone responsive to an HFAC signal being provided to the first feeder circuit zone from a location downstream of the first feeder circuit zone, cause the operating mechanism to perform an instantaneous trip of the separable contacts based on a determination that the HFAC signal magnitude satisfies a first parameter, and cause the operating mechanism to perform a hold and delay trip of the separable contacts based on a determination that the HFAC signal magnitude satisfies a second parameter.

In still another embodiment, a method of protecting a power distribution system from a fault on a feed conductor thereof is provided. An HFAC signal is provided to the feed conductor from a location downstream of the feed conductor in the power distribution system. The method includes, in a module located upstream of the feed conductor in the power distribution system, determining an HFAC signal magnitude in the module, the module including a circuit interrupter, and controlling operation of the circuit interrupter based on the determined magnitude.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
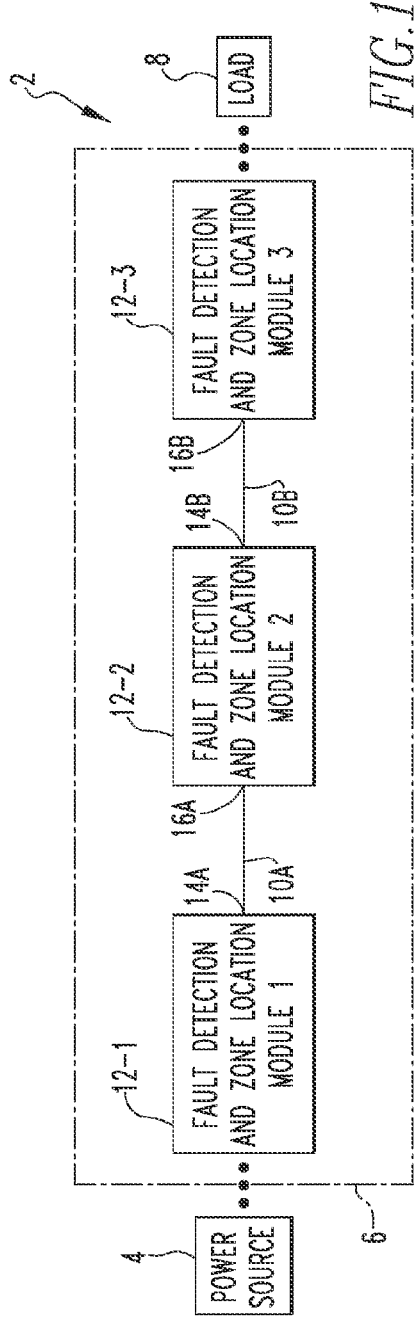
FIG. 1 is a schematic diagram of a power distribution system according to an exemplary embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the term "hold and delay trip" shall refer to a condition where a circuit interrupter, upon sensing an overcurrent condition, intentionally delays initiating the opening of the separable contacts thereof for a predetermined time period (i.e., the circuit interrupter delays tripping for a certain time during an overcurrent condition when it receives a zone selection coordination signal).

As employed herein, the term "instantaneous trip" shall refer to a condition where a circuit interrupter, upon sensing a short circuit (high overcurrent) condition, immediately and without any intentional delay initiates the opening of the separable contacts thereof.

As employed herein, the term "high frequency signal (HF signal) or high frequency alternating current signal (HFAC signal)" shall mean an AC signal that has a frequency significantly higher than that of the 50/60 Hz power signal (for example: 10 kHz-100 kHz-1 MHz).

FIG. 1 is a schematic diagram of a power distribution system 2 according to an exemplary embodiment of the disclosed concept. As seen in FIG. 1, power distribution system 2 includes a power source 4, such as, without limitation, a three phase AC power source, a fault detection and zone location system 6, and a load 8. As described in greater detail herein, fault detection and zone location system 6 is configured to detect and locate faults in power distribution system 2 in order to improve selective coordination within power distribution system 2.

Referring again to FIG. 1, fault detection and zone location system 6 according to the exemplary embodiment includes a number of feeder circuit zones 10 (each including a number of power feed conductors) and a number of fault detection and zone location modules 12 connected in series, wherein each feeder circuit zone 10 has an upstream end 14 and a downstream end 16. In addition, as seen in FIG. 1, for each feeder circuit zone 10, a zone location module 12 is provided at each of the upstream end 14 and the downstream end 16 thereof. In the non-limiting illustrative exemplary embodiment shown in FIG. 1, two feeder circuit zones 10 (labeled 10A and 10B) and three fault detection and zone location modules 12 (labeled 12-1, 12-2 and 12-3) are shown. It will be understood, however, that the said example is meant for illustrative purposes only and that a greater or lesser number of such components may also be present within the scope of the disclosed concept. As described in greater detail herein, fault detection and zone location system 6 employs a methodology wherein a HFAC signal is injected into each feeder circuit zone 10 from the fault detection and zone location module 12 located at its downstream end 16 and wherein the HFAC signal magnitude is monitored at the fault detection and zone location module 12 located at the upstream end 14 of the feeder circuit zone 10 to detect the change, if any, in magnitude (attenuation) of the HFAC signal and thus the presence of a fault in the feeder circuit zone 10. Each fault detection and zone location module 12 also functions to isolate the HFAC signal and prevent it from propagating through that fault detection and zone location module 12 to another, upstream feeder circuit zone 10 and beyond.

Figure 2:
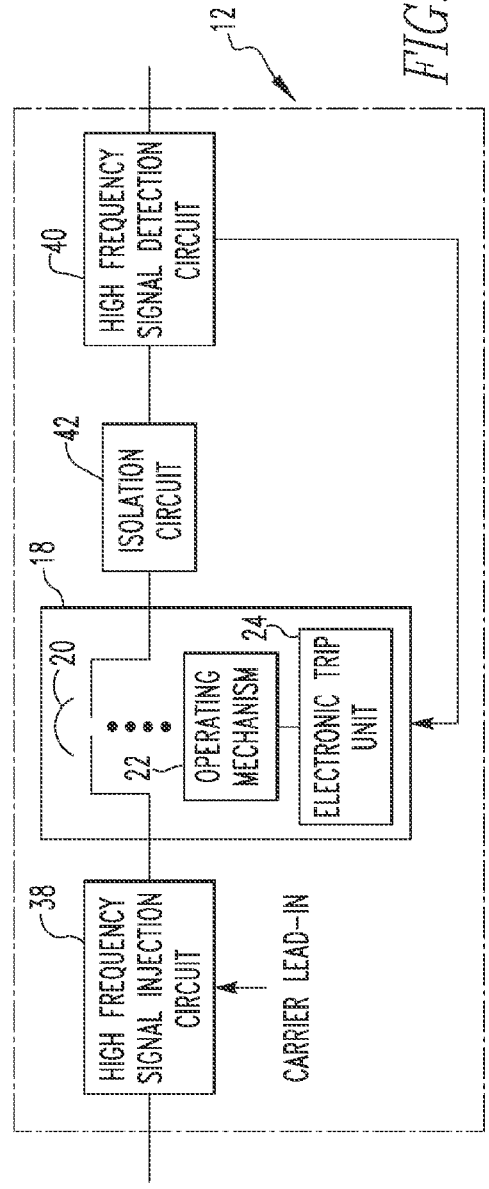
FIG. 2 is a schematic diagram of a fault detection and zone location module employed in the system of FIG. 1 according to one non-limiting exemplary embodiment.

FIG. 2 is a schematic diagram of fault detection and zone location module 12 according to one non-limiting exemplary embodiment. Fault detection and zone location module 12 includes a circuit interrupter 18, which in the non-limiting exemplary embodiment is a circuit breaker, and in particular an MCCB. Circuit interrupter 18 in each fault detection and zone location module 12 is configured to protect power distribution system 2 from damage due to an overcurrent, a short circuit, and/or other fault conditions, and includes separable contacts 20, an operating mechanism 22 structured to open and close separable contacts 20, and an electronic trip unit 24 which cooperates with operating mechanism 22 to trip open separable contacts 20.

Figure 3:
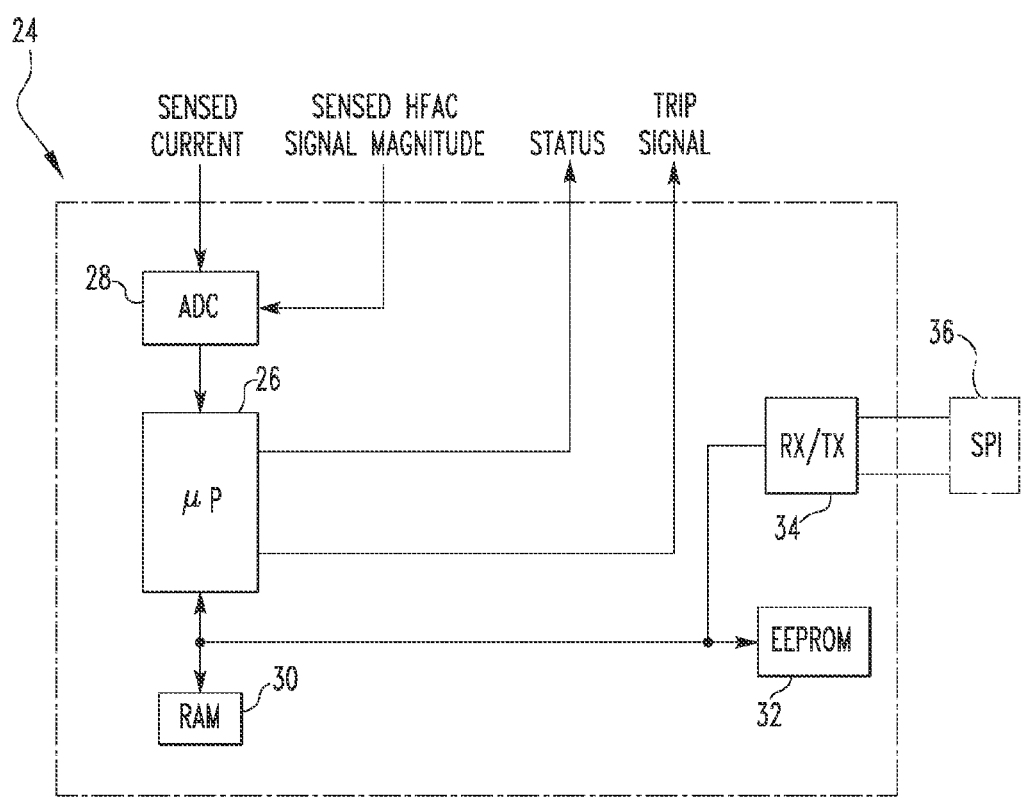
FIG. 3 is a schematic diagram showing certain selected components of an electronic trip unit of a circuit interrupter employed in the fault detection and zone location module of FIG. 2 according to an exemplary embodiment.

FIG. 3 is a schematic diagram showing certain selected components of electronic trip unit 24 of circuit interrupter 18 according to an exemplary embodiment. As seen in FIG. 3, electronic trip unit 24 includes a microprocessor (µP) 26 which controls the operation of electronic trip unit 24. Alternatively, microprocessor 26 may be another type of processing or control unit, such as, without limitation, a microcontroller or some other suitable processing device. Electronic trip unit 24 further includes an analog-to-digital converter (ADC) 28, a random access memory (RAM) 30, and an EEPROM 32, each of which is coupled to microprocessor 26. ADC 28 is structured to receive signals, such as a number of current signals (indicating the current of the circuit to which circuit interrupter 18 is connected) that are sensed by sensors (not shown; e.g., a number of current transformers or Rogowski coils) forming part of circuit interrupter 18 and convert those signals to digital data that is appropriate for microprocessor 26. ADC 28 is also structured to receive signals from the high frequency detection circuit 40, for instance with no limitation the magnitude of the detected HFAC signal, or any signals that indicates the presence or absence of the HFAC signal. It is notable that the said signal can also be alternatively a digital signal that feeds directly to the microprocessor (µP) 26. As will be appreciated, that data may be stored in RAM 30 and/or used by the trip unit program implemented in and run by microprocessor 26 in determining whether and when to issue a trip signal for tripping operating mechanism 22. In addition, in the exemplary embodiment, EEPROM 32 stores (in nonvolatile memory) the functional trip parameters of electronic trip unit 24 which define the operating characteristics thereof, and which are read into microprocessor 26 as needed by the trip unit program. Electronic trip unit 24 also includes a communication interface 34 coupled to a serial port interface (SPI) 36. Communication interface 34 is, in turn, operatively coupled to microprocessor 26 to allow for serial data communication with microprocessor 26.

Referring again to FIG. 2, fault detection and zone location module 12 also includes a high frequency injection circuit 38 that is provided on and coupled to an upstream side of separable contacts 20 (i.e., the line side of circuit interrupter 18). High frequency injection circuit 38 is structured to generate and inject a HFAC signal (e.g., 100 kHz or higher or lower) into the feeder circuit zone 10 located immediately upstream from it. Fault detection and zone location module 12 further includes a high frequency detection circuit 40 that is provided on and coupled to a downstream side of separable contacts 20 (i.e., the load side of circuit interrupter 18). High frequency detection circuit 40 is structured to detect and measure the magnitude of HFAC signal that is provided to fault detection and zone location module 12 through a downstream feeder circuit zone 10 as described herein. In addition, high frequency detection circuit 40 provides an output to electronic trip unit 24 that indicates the presence and/or magnitude of the detected and measured HFAC signal. Finally, fault detection and zone location module 12 includes an isolation circuit 42 that is provided between high frequency detection circuit 40 and the load side of circuit interrupter 18. Isolation circuit 42 is structured to create a high impedance which isolates the HFAC signals that may be received by high frequency detection circuit 40 and prevents such HF signals from propagating through circuit interrupter 18 to an upstream feeder circuit zone 10. In the exemplary embodiment, isolation circuit 42 is a resonant LC circuit having a resonant frequency equal to the frequency of signal being injected immediately downstream from it. It is worth noting that isolation circuit 42 will have negligible impedance in a 60 Hz power system.

In each fault detection and zone location module 12, the high frequency injection circuit 38, the high frequency detection circuit 40, and/or the isolation circuit 42 may be internal or external to the physical housing of circuit interrupter 18.

For illustrative purposes, operation of fault detection and zone location system 6 will be described in connection with a short circuit fault occurring in feeder circuit zone 10B shown in FIG. 1. It will be understood, however, that the described operation is applicable to any of the other portions of fault detection and zone location system 6 as appropriate. When a short circuit fault occurs on a feed conductor of feeder circuit zone 10B, the HFAC signal being injected into feeder circuit zone 10B by the high frequency signal injection circuit 38 of fault detection and zone location module 12-3 as described herein will be attenuated by the fault. As a result, the high frequency signal detection circuit 40 of fault detection and zone location module 12-2 will see a dramatic decrease in the HFAC signal magnitude. In other words, the output signal being generated by high frequency signal detection circuit 40 of fault detection and zone location module 12-2 and provided to the electronic trip unit 24 of fault detection and zone location module 12-2 will indicate a decreased magnitude (as compared to what would be expected without a fault). According to an aspect the disclosed concept, the electronic trip unit 24 of fault detection and zone location module 12-2 is programmed to, in response to such a situation, perform a "normal" instantaneous trip. Note also that in such a situation, isolation circuit 42 of fault detection and zone location module 12-2 prevents the short circuit fault on the feed conductor of feeder circuit zone 10B from attenuating the HFAC signal being generated by the high frequency signal injection circuit 38 of fault detection and zone location module 12-2 and injected into feeder circuit zone 10A. As a result, fault detection and zone location module 12-1 will still see the HFAC signal being injected into feeder circuit zone 10A by the high frequency signal injection circuit 38 of fault detection and zone location module 12-2 during a short circuit fault on feeder circuit zone 10B, indicating that, according to the disclosed concept, the circuit interrupter 18 of fault detection and zone location module 12-1 should delay tripping (i.e., perform a hold and delay trip) since the circuit interrupter 18 of fault detection and zone location module 12-2, which is downstream, is expected to trip first and clear the fault.

Thus, according to the disclosed concept, presence and/or magnitude of each HFAC signal is used to provide selective coordination among circuit interrupters 18. In addition, the absence of or significant attenuation of the HFAC signal results in a normal instantaneous trip (failsafe condition). Therefore, in the exemplary embodiment and according to the disclosed concept, this methodology may be implemented by programming the electronic trip unit 24 of each fault detection and zone location module 12 to: (i) perform an instantaneous trip in response to (a) sensing an overcurrent condition and (b) determining that the magnitude of the HFAC signal that is measured by the high frequency signal detection circuit 40 of the fault detection and zone location module 12 satisfies a first parameter, such as falling below a predetermined level, i.e., decreasing at least a certain amount from what is expected in the absence of a fault (e.g., without limitation, a 60%, 70% or 80% decrease); and (ii) perform a hold and delay trip in response to (a) sensing an overcurrent condition and (b) determining that the magnitude of the HFAC signal that is measured by the high frequency signal detection circuit 40 of the fault detection and zone location module 12 satisfies a second parameter, such as remaining above the predetermined level described above. In one particular, non-limiting exemplary implementation, the magnitude of the HFAC signal is determined under "nominal, non-faulted" conditions, and that value is set as unity. The "fault" threshold will then be set at some percentage of unity (i.e. 60%, 70%, or 80%), based on the expectation of a short circuit fault causing the HF signal to be attenuated by approximately 90%, thus leaving margin for variations in actual HFAC signal magnitude under different noise and fault conditions.

Figure 4A:
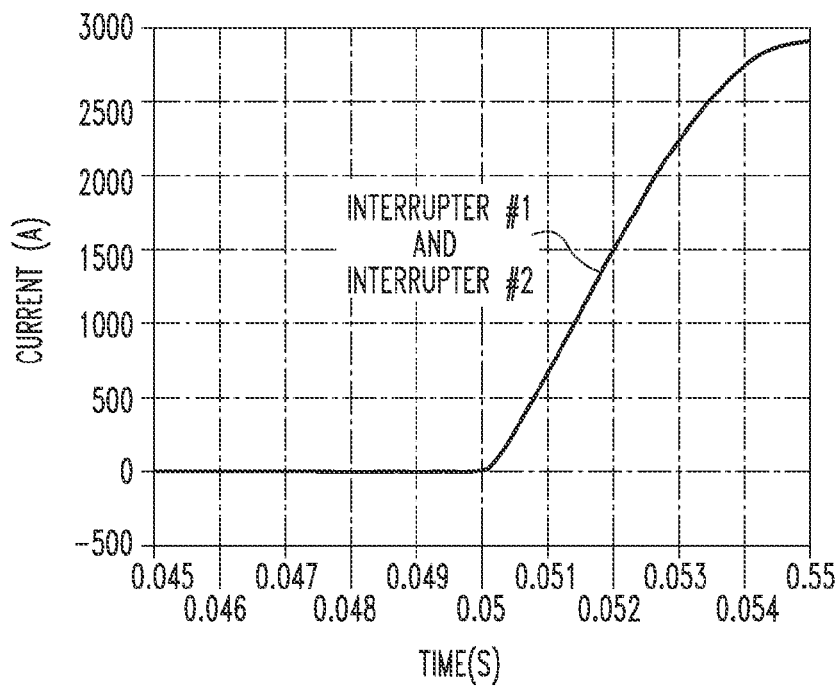
FIGS. 4A and 4B are exemplary current waveforms which illustrate the operation of the system of FIG. 1 according to an exemplary embodiment.
Figure 4B:
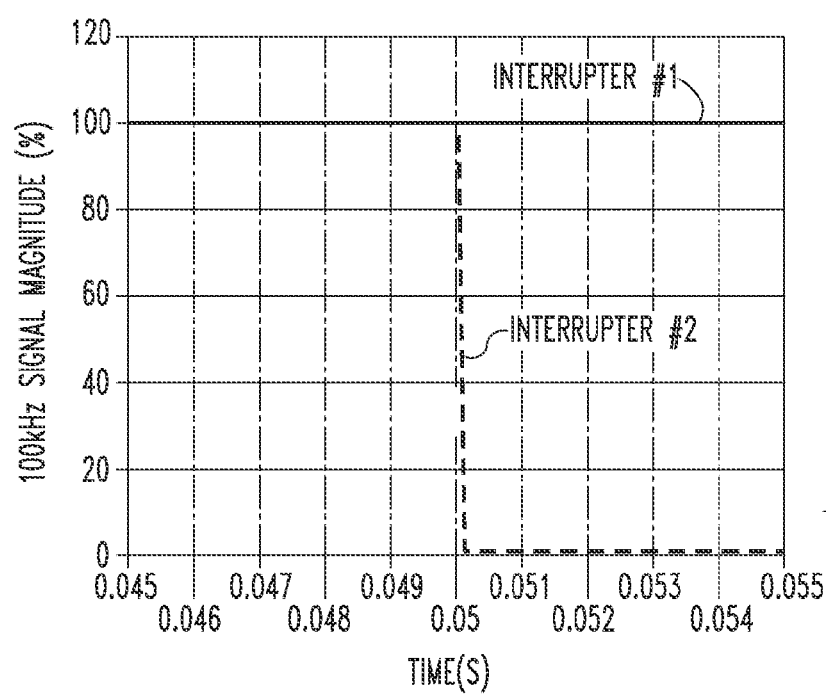

FIGS. 4A and 4B demonstrate this operation in an example where each high frequency signal injection circuit 38 injects a 100 kHz signal and where a short circuit fault occurs in feeder circuit zone 10B at 0.5 seconds. As shown in FIG. 4A, where circuit interrupters 18 of both fault detection and zone location module 12-1 and fault detection and zone location module 12-2 experience overcurrent. However, by looking at the magnitude of the 100 kHz signal at fault detection and zone location module 12-1 and fault detection and zone location module 12-2 as shown in FIG. 4B, a more than 90% decrease of the 100 kHz signal is observed at fault detection and zone location module 12-2 with a response time less than 1 millisecond. At the same time, the 100 kHz signal at fault detection and zone location module 12-1 remains constant. The different 100 kHz signal responses at fault detection and zone location module 12-1 and fault detection and zone location module 12-2 ensures the location and mitigation of the fault only to the loop zone between fault detection and zone location module 12-2 and fault detection and zone location module 12-3 (i.e., feeder circuit zone 10B). In other words, given the above fault condition, circuit interrupter 18 of fault detection and zone location module 12-2 will perform a "normal" instantaneous trip, while circuit interrupter 18 of fault detection and zone location module 12-1 will perform a hold and delay trip as it sees the 100 kHz signal injected upstream from fault detection and zone location module 12-2.

In the exemplary embodiment just described, the same HFAC signal is used for each of the different zones so that it does not matter where a circuit interrupter 18 is located (upstream, downstream, or parallel branch). Alternatively, different high frequency signals/bands could be used for different zones to assure proper signal recognition, but this may require an additional commissioning/tuning step.

Figure 5:
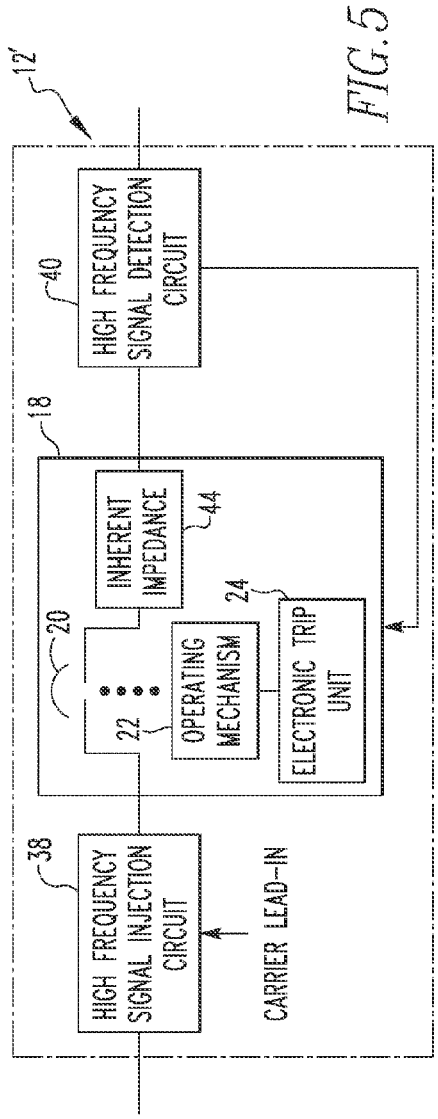
FIG. 5 is a schematic diagram of a fault detection and zone location module that may be employed in the system of FIG. 1 according to an alternative non-limiting exemplary embodiment.

FIG. 5 is a schematic diagram of a fault detection and zone location module 12' according to an alternative exemplary embodiment that may be used in power distribution system 2 in place of fault detection and zone location module 12. Fault detection and zone location module 12' is similar to fault detection and zone location module 12, and like components are labeled with like reference numerals. However, in fault detection and zone location module 12', a separate isolation circuit 42 is not employed. Instead, fault detection and zone location module 12' utilizes the inherent impedance 44 of circuit interrupter 18 to provide the isolation function described elsewhere herein (e.g., the internal conduction path of circuit interrupter 18 may be physically designed to have a desired resonance).

Figure 6:
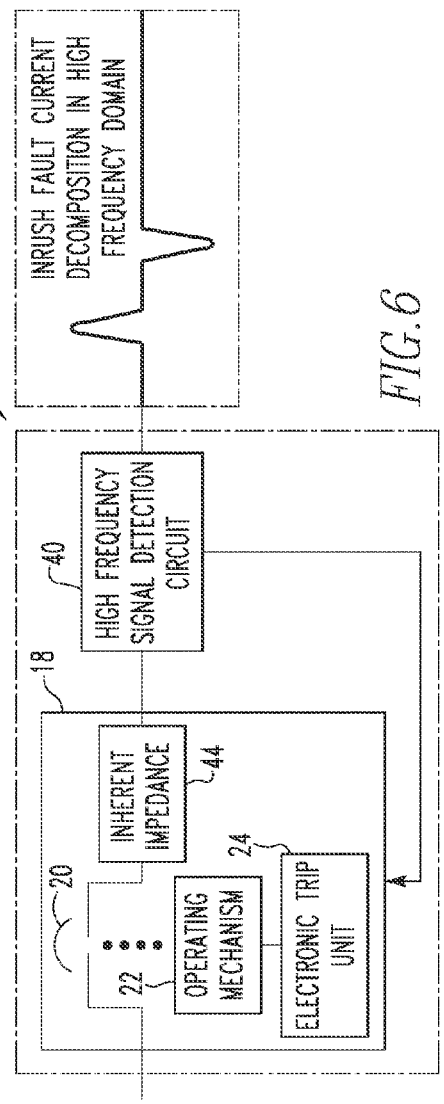
FIG. 6 is a schematic diagram of a fault detection and zone location module that may be employed in the system of FIG. 1 according to a further alternative non-limiting exemplary embodiment.

FIG. 6 is a schematic diagram of a fault detection and zone location module 12" according to another alternative exemplary embodiment that may be used in power distribution system 2 in place of fault detection and zone location module 12. Fault detection and zone location module 12" is similar to fault detection and zone location module 12', and like components are labeled with like reference numerals. However, in fault detection and zone location module 12", a separate high frequency injection circuit is not employed. Instead, fault detection and zone location module 12" utilizes the inherent high frequency characteristic 46 of inrush fault current to provide the high frequency signal injection function described elsewhere herein. The difference is that the presence of the HFAC signal detected by high frequency detection circuit 40 in fault detection and zone location module 12" indicates a fault condition. The high frequency signal created by fault current is received by detection circuit 40, and the inherent impedance 44 prevents it from propagating through that fault detection and zone location module 12" to another, upstream feeder circuit zone 10 and beyond. In still a further alternative, fault detection and zone location module 12" may employ a separate isolation circuit 42 as in fault detection and zone location module 12 (FIG. 2).

Figure 7:
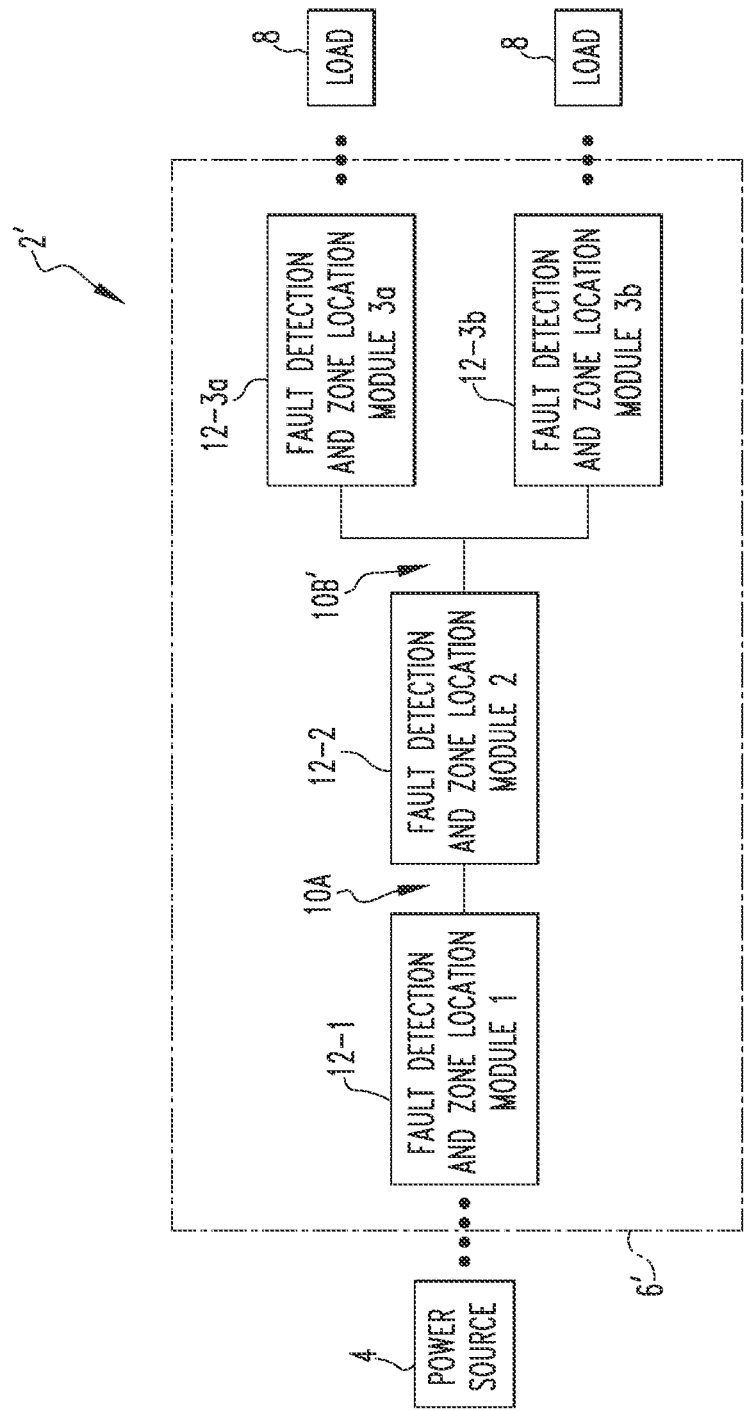
FIG. 7 is a schematic diagram of a power distribution system according to an alternative exemplary embodiment of the disclosed concept.

FIG. 7 is a schematic diagram of a power distribution system 2' according to an alternative exemplary embodiment of the disclosed concept. Power distribution system 2' is similar to power distribution system 2, and like components are labeled with like reference numerals. Power distribution system 2' includes a power source 4, a number of loads 8, and an alternative fault detection and zone location system 6'. Fault detection and zone location system 6' differs from fault detection and zone location system 6 in that it includes an alternative feeder circuit zone 10B' having a number of parallel branches each connected to a downstream fault detection and zone location module 12 (or 12' or 12"; in the illustrated example they are labeled 12-3a and 12-3b). Like fault detection and zone location system 6, fault detection and zone location system 6' is configured to detect and locate faults in power distribution system 2' in order to improve selective coordination within power distribution system 2'. Thus, where a short circuit fault occurs in feeder circuit zone 10B', circuit interrupter 18 of fault detection and zone location module 12-2 will perform a "normal" instantaneous trip, while circuit interrupter 18 of fault detection and zone location module 12-1 will perform a hold and delay trip as described herein. In addition, in this embodiment, it is only necessary that one of fault detection and zone location module 12-3a and 12-3b has an operating high frequency injection circuit 38 to inject the HFAC signal into feeder circuit zone 10B'.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of providing selective coordination in a power distribution system having a first feeder circuit zone and a second feeder circuit zone located downstream from the first feeder circuit zone in response to a fault in the second feeder circuit zone, wherein the power distribution system includes a first module having a first circuit interrupter located upstream of the first feeder circuit zone and a second module having a second circuit interrupter located between the first feeder circuit zone and second feeder circuit zone, and wherein a first HFAC signal is provided to the first feeder circuit zone from a location downstream of the first feeder circuit zone and a second HFAC signal is provided to the second feeder circuit zone from a location downstream of the second feeder circuit zone, the method comprising:
   determining a second HFAC signal magnitude in the second module;
   causing the second circuit interrupter to perform an instantaneous trip in response to a sensed overcurrent condition in the second circuit interrupter and based on a value of the second HFAC signal magnitude;
   determining a first HFAC signal magnitude in the first module; and
   causing the first circuit interrupter to perform a hold and delay trip in response to a sensed overcurrent condition in the first circuit interrupter and based on a value of the first HFAC signal magnitude.

2. The method according to claim 1, wherein the causing the second circuit interrupter to perform an instantaneous trip comprises causing the second circuit interrupter to perform an instantaneous trip in response to the value of the second HFAC signal magnitude being less than or equal to a second value, and wherein the causing the first circuit interrupter to perform a hold and delay trip comprises causing the first circuit interrupter to perform a hold and delay trip in response to the value of the first HFAC signal magnitude being greater than a first value.

3. The method according to claim 2, wherein the first value and the second value are equal.

4. The method according to claim 2, wherein the second value is zero.

5. The method according to claim 1, further comprising generating the first HFAC signal in the second module and injecting the first HFAC signal into the first feeder circuit zone from the second module, and generating the second HFAC signal in a third module located downstream of the second feeder circuit zone and injecting the second HFAC signal into the second feeder circuit zone from the third module.

6. The method according to claim 1, further comprising isolating the first feeder circuit zone from the second HFAC signal.

7. A circuit interrupter for use in a location upstream of a first feeder circuit zone of a power distribution system, comprising:
   separable contacts;

an operating mechanism configured to open and close the separable contacts; and an electronic trip unit structured to cooperate with the operating mechanism to trip open the separable contacts, the electronic trip unit being structured and configured to:

receive a number of current signals indicating a current of a circuit to which the circuit interrupter is connected;

receive an HFAC signal magnitude measured at the location upstream of the first feeder circuit zone responsive to an HFAC signal being provided to the first feeder circuit zone from a location downstream of the first feeder circuit zone;

cause the operating mechanism to perform an instantaneous trip of the separable contacts in response to a sensed overcurrent condition in the circuit interrupter and based on a determination that the HFAC signal magnitude satisfies a first parameter; and cause the operating mechanism to perform a hold and delay trip of the separable contacts in response to a sensed overcurrent condition in the circuit interrupter and based on a determination that the HFAC signal magnitude satisfies a second parameter.

8. The circuit interrupter according to claim 7, wherein the first parameter comprises the HFAC signal magnitude being less than or equal to a first value, and wherein the second parameter comprises the HFAC signal magnitude being greater than a second value.

9. The circuit interrupter according to claim 8, wherein the first value and the second value are equal.

10. A fault detection and zone location module including the circuit interrupter according to claim 7 and an HFAC signal detection circuit structured to measure the HFAC signal magnitude.

11. The fault detection and zone location module according to claim 10, further comprising an HFAC signal injection circuit for generating a second HFAC signal and providing the second HFAC signal to a second feeder circuit zone located upstream of the circuit interrupter of the fault detection and zone location module of claim 10 in the power distribution system.

12. The fault detection and zone location module according to claim 10, further comprising an HFAC isolation circuit located between the circuit interrupter and the HFAC signal detection circuit.

13. The fault detection and zone location module according to claim 10, wherein the HFAC signal detection circuit is provided within a housing of the circuit interrupter.

14. A system including the circuit interrupter and the first feeder circuit zone according to claim 7, a second circuit interrupter located upstream of the circuit interrupter, and a second feeder circuit zone located between the circuit interrupter and the second circuit interrupter, the second circuit interrupter including:

second separable contacts;

a second operating mechanism configured to open and close the second separable contacts; and a second electronic trip unit structured to cooperate with the second operating mechanism to trip open the second separable contacts, the second electronic trip unit being structured and configured to:

receive a number of second current signals indicating a current of a circuit to which second circuit interrupter is connected;

receive a second HFAC signal magnitude measured at a location upstream of the second feeder circuit zone responsive to a second HFAC signal being provided to the second feeder circuit zone from a location downstream of the second feeder circuit zone;

cause the second operating mechanism to perform an instantaneous trip of the second separable contacts based on a determination that the second HFAC signal magnitude satisfies the first parameter; and cause the operating mechanism to perform a hold and delay trip of the separable contacts based on a determination that the HFAC signal magnitude satisfies the second parameter.

15. The system according to claim 14, wherein the HFAC signal and the second HFAC signal have the same frequency.

16. The system according to claim 14, wherein the HFAC signal and the second HFAC signal have different frequencies.

17. The system according to claim 14, wherein the first feeder circuit zone includes a number of parallel branches each being connected to a downstream module having a downstream circuit interrupter, wherein the HFAC signal is provided to the first feeder circuit zone by one of the downstream modules.

18. A method of protecting a power distribution system from a fault on a feed conductor thereof, wherein an HFAC signal is provided to the feed conductor from a location downstream of the feed conductor in the power distribution system, the method comprising:

in a module located upstream of the feed conductor in the power distribution system, determining an HFAC signal magnitude in the module, the module including a circuit interrupter; and controlling operation of the circuit interrupter by causing an instantaneous trip of the circuit interrupter in response to a sensed overcurrent condition in the circuit interrupter and in response to the determined magnitude falling below a predetermined value.

* * * * *